US007352279B2

(12) United States Patent
Yu et al.

(10) Patent No.: US 7,352,279 B2
(45) Date of Patent: Apr. 1, 2008

(54) RULE BASED INTELLIGENT ALARM MANAGEMENT SYSTEM FOR DIGITAL SURVEILLANCE SYSTEM

(75) Inventors: Mike Yu, Basking Ridge, NJ (US); Hitoshi Yashio, Yokohama (JP); Jun Kikukawa, Yokohama (JP); Namsoo Joo, Somerset, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 144 days.

(21) Appl. No.: 11/071,048

(22) Filed: Mar. 2, 2005

(65) Prior Publication Data

US 2006/0208872 A1 Sep. 21, 2006

(51) Int. Cl.
*G08B 23/00* (2006.01)
*G08B 25/00* (2006.01)
*G06F 19/00* (2006.01)

(52) U.S. Cl. ...................... 340/517; 340/506; 340/525; 340/521; 340/531; 700/17; 700/83

(58) Field of Classification Search ................ 340/517, 340/539.16, 539.17, 539.18
See application file for complete search history.

(56) References Cited

U.S. PATENT DOCUMENTS

| | | | |
|---|---|---|---|
| 5,063,523 A * | 11/1991 | Vrenjak | 709/223 |
| 5,955,946 A * | 9/1999 | Beheshti et al. | 340/506 |
| 6,192,282 B1 * | 2/2001 | Smith et al. | 700/19 |
| 6,414,594 B1 * | 7/2002 | Guerlain | 340/506 |
| 6,529,137 B1 * | 3/2003 | Roe | 340/691.1 |
| 6,774,786 B1 * | 8/2004 | Havekost et al. | 340/517 |

* cited by examiner

*Primary Examiner*—Donnie L. Crosland
(74) *Attorney, Agent, or Firm*—Harness, Dickey & Pierce, PLC

(57) ABSTRACT

An alarm management system includes an alarm receiver module receiving customized alarms from one or more of sensor devices and surveillance systems. A condition evaluation module performs an evaluation of one or more customized conditions for a customized alarm. An action handling module executes customized actions based on the evaluation.

23 Claims, 5 Drawing Sheets

RULE BASED INTELLIGENT ALARM MANAGEMENT SYSTEM FOR DIGITAL SURVEILLANCE SYSTEM

FIELD OF THE INVENTION

The present invention generally relates to security systems, and relates in particular to an alarm management system.

BACKGROUND OF THE INVENTION

Specifications of alarms and alarm handling mechanisms in surveillance systems tend to be different for each surveillance application. However, user requirements have tendency to keep changing. Therefore, it is difficult to predefine and develop a system to support all surveillance applications. Moreover, each surveillance system has its own format of alarms and actions that are not interoperable with other surveillance systems. In enterprise or wide area sensor network surveillance environments where surveillance systems from many vendors are installed, demands to uniformly and efficiently manage alarms and actions increase. Thus, there is a need for a way to ease dynamic alarm definition and development, and to uniformly and efficiently manage alarms and actions, especially in enterprise and wide area sensor network surveillance environments. The present invention fulfills this need.

SUMMARY OF THE INVENTION

In accordance with the present invention, an alarm management system includes an alarm receiver module receiving customized alarms from one or more of sensor devices and surveillance systems. A condition evaluation module performs an evaluation of one or more customized conditions for a customized alarm. An action handling module executes customized actions based on the evaluation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

As summarized above, an alarm management system according to the present invention includes an alarm receiver module receiving customized alarms from one or more of sensor devices and surveillance systems. A condition evaluation module performs an evaluation of one or more customized conditions for a customized alarm. An action handling module executes customized actions based on the evaluation.

Various embodiments of the system can be realized. In some embodiments, the three aforementioned modules support simultaneous execution and reference to a shared state information including accumulated meta data. Examples of accumulated metadata include a history of events, effects of the events, dynamic configuration information of one or more devices generating the events, and selected portions of description meta data associated with the events. In some embodiments, external MPEG7 meta data can be employed as state information that an alarm rule can use to process incoming events more intelligently. In some embodiments, the system can allow both the developers and end users to create dynamically one or more of new shared state definitions, new rules, and new actions. In some embodiments, the shared states can be in one or more of the device, local memory, remote memory, and an external database. In some embodiments, the condition evaluation of a rule can be based not only on the state, but can also be based on dynamically generated time stamps and other data correlating the execution of rule and consequent firing of actions. This unique execution model is most effective in detecting multiple inter-correlated event patterns based on time, space, and other meta data (such as success or failure of execution, etc.) for high performance and reliable alarm processing. Features and functionalities of the aforementioned embodiments can be combined in various ways.

As further explained below, a rule based, intelligent alarm management system according to the present invention allows modification of format of an alarm, plus modification of alarm handling logic, without redevelopment of the system. For example, the alarm management system can be implemented using object oriented technology, dynamic class loading technology, and rule engine technology. Also, features, complex alarm management, alarm correlation, and alarm filtering can be realized. Further, the alarm management system of the present invention is easy to integrate with external systems if needs arise to access the external systems to handle alarms. In summary, the alarm handling approach of the present invention contributes to avoiding a new development cycle in order to modify an alarm management system of the present invention, significantly enhances capability of the alarm management system, and easily interacts with external systems.

Figure 1:
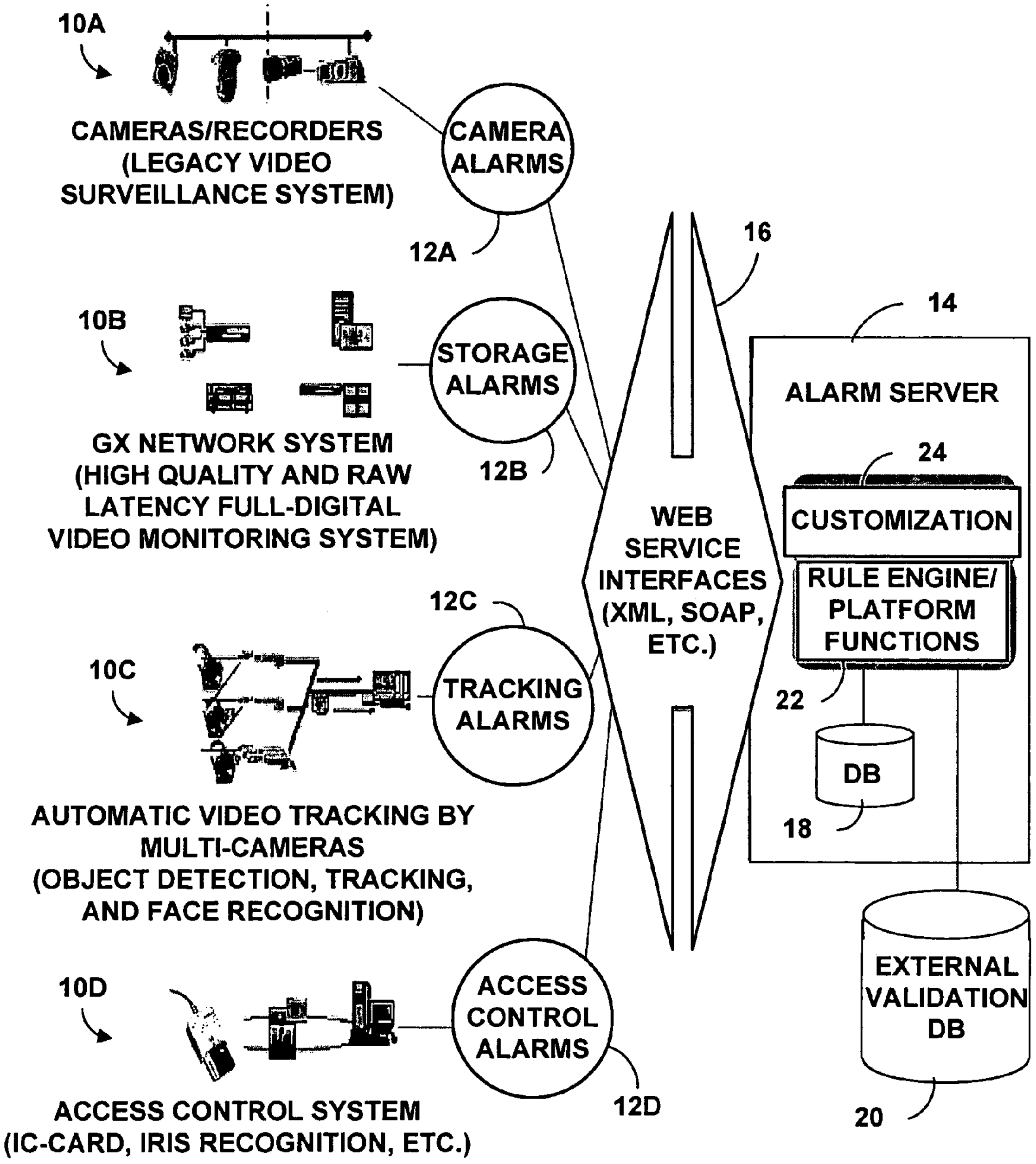
FIG. 1 is a block diagram illustrating an alarm server in accordance with the present invention.

Referring to FIG. 1, each surveillance system 10A-10D has its own format of alarms 12A-12D. These alarms 12A-12D are sent to an alarm server 14 via web services 16, a standard open interface for inter system communication. The alarm server 14 manages different formats of alarms 12A-12D, including camera alarms 12A, storage alarms 12B, tracking alarms 12C, and access control alarms 12D. It also has local databases 18 and may communicate with external databases 20 for the purpose of validation. The dynamic configuration information of a device may be read from this external databases at runtime too. The objectives discussed above are realized by provision of rule engine/platform functions 22 having customization interfaces 24.

Figure 2:
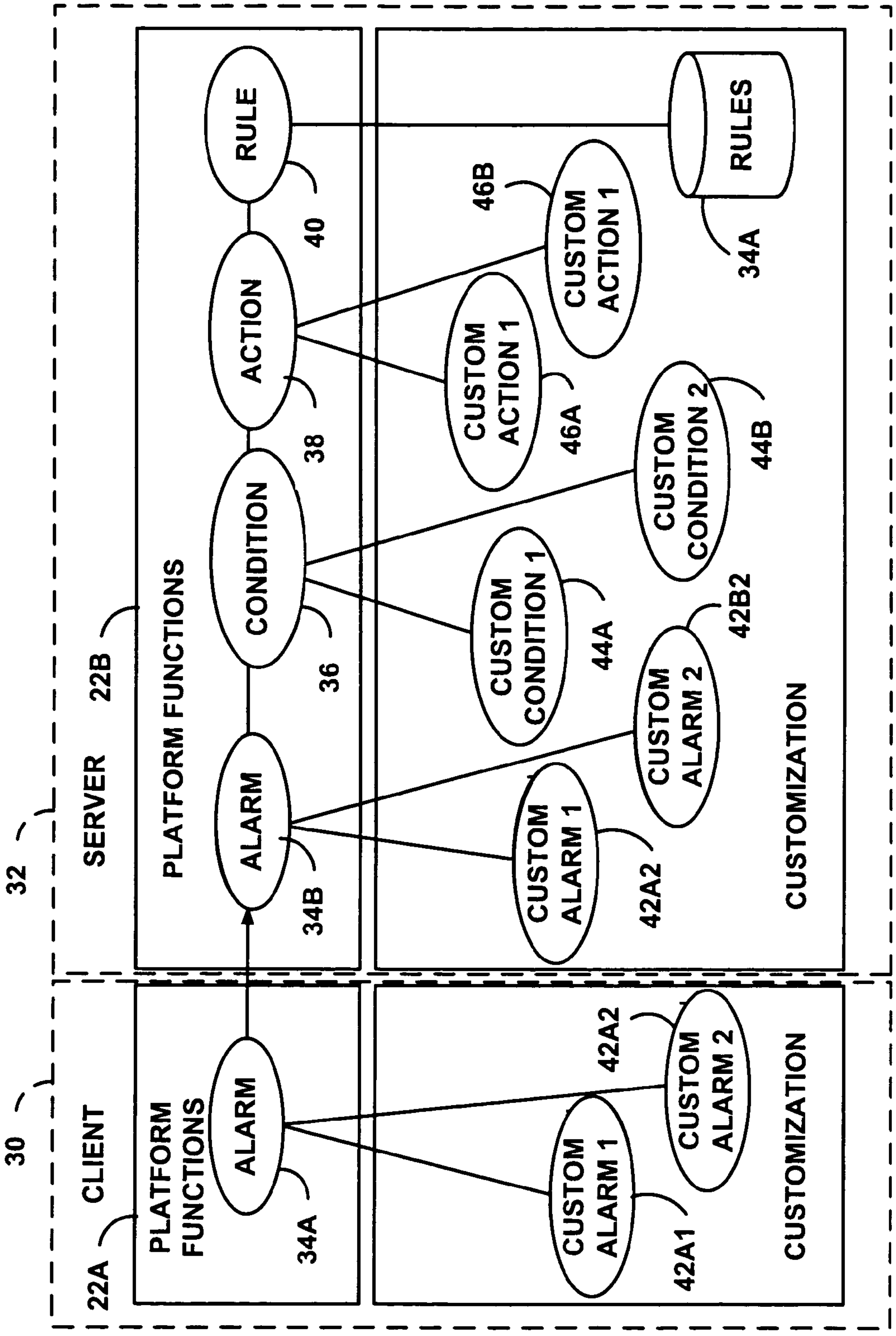
FIG. 2 is a block diagram illustrating platform functions and customization of an alarm server in accordance with the present invention.

Turning now to FIG. 2, client and server platform functions 22A and 22B for a client 30 and a server 32 implement management of basic alarms 34A and 34B, conditions 36, actions 38, rules 40, interfaces to database, and web service communication between clients and the server. It also provides customization interfaces 24A and 24B via SDK or API so that custom alarms 42A1, 42A2, 42B1, and 42B2, custom conditions 44A and 44B, and custom actions 46A and 46B can be realized without reprogramming the platform. Customers can define their own alarms, conditions, and actions and create instances of custom rules 48. Then the platform can manage the rest.

Figure 3:
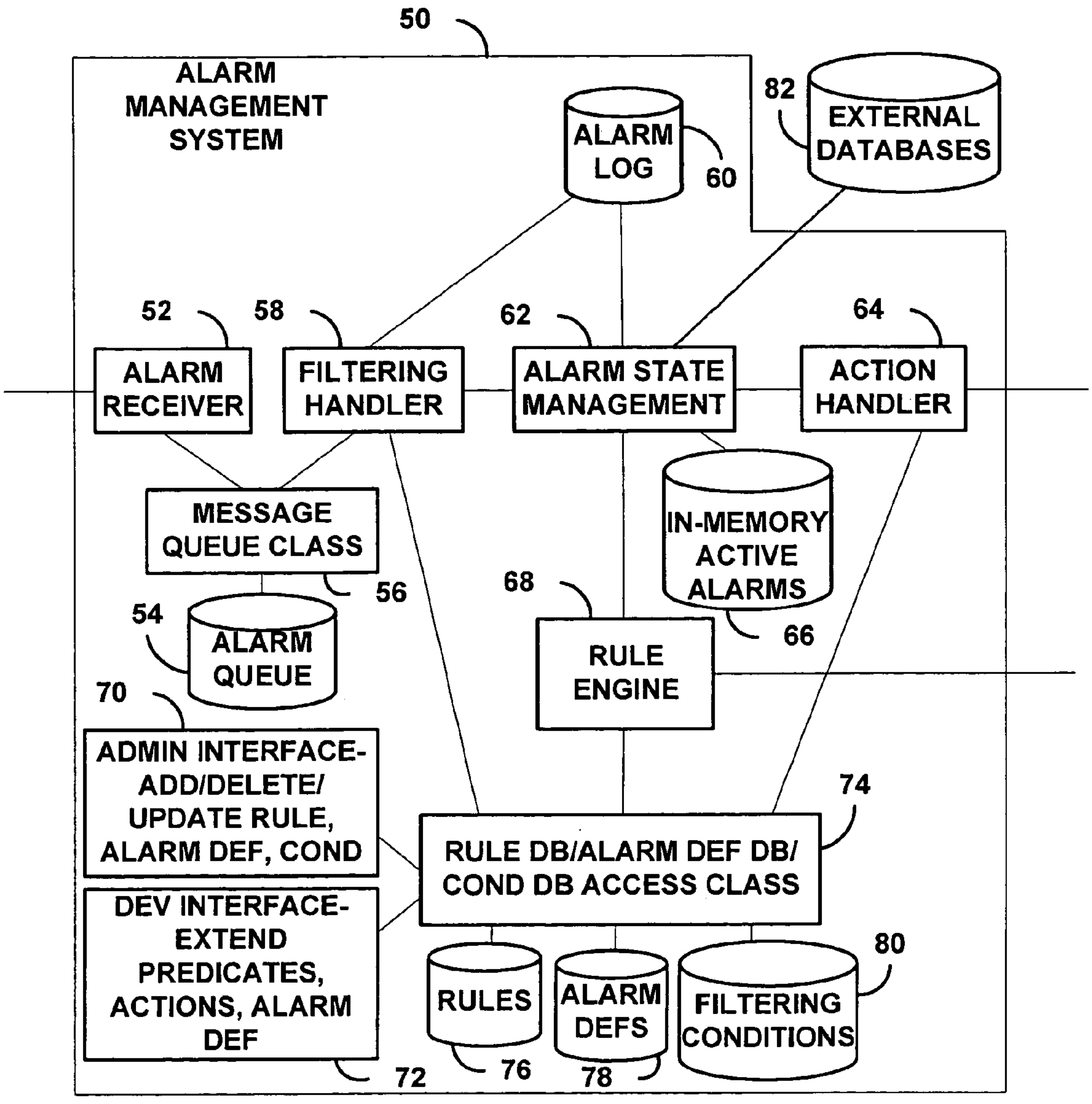
FIG. 3 is a block diagram illustrating an alarm management system in accordance with the present invention.

Turning now to FIG. 3, alarm management system 50 formed by this server includes modules and databases/data structures. Alarm receiver module 52 receives alarms from sensor devices, or other surveillance systems, and saves them to a persistent alarm queue DB 54. The alarms are handled later. Message queue class 56 provides APIs to access the alarm queue DB 54. Filtering handler 58 fetches an alarm from the queue DB 54 and applies a filtering condition to the alarm. If the condition is met, the alarm is ignored and saved to alarm log DB 60. Otherwise, it is forwarded to alarm state management module 62 for further processing. Alarm state management module 62 manages lifecycles of alarms and keeps track of active alarms 66. Action handler 64 dynamically loads customized actions and executes them. Some actions may need to communicate with external systems. Rule engine 68 reads rules and evaluates them. It also reads active alarms to correlate alarm with the history of event. It may request external systems to evaluate conditions. Administration interface 70 allows an administrator to manage the system. It provides ways to search, add, delete, and update instances of rules, alarm definitions, and filtering conditions. Development interface 72 allows developers to extend the system. It provides SDK and APIs to customize alarms, predicates, and actions and to save implementation files. Rule DB/alarm definition DB/condition DB access class 74 provides an API to access the rule DB 76, alarm definition DB 78, and filtering condition DB 80. External databases 82 provide the dynamic configuration information of a device. Rule engine 68 uses the information when it handles the alarm.

There are different kinds of databases and data structures in the alarm server: a relational database for message queue, XML files to store instances of rules and alarms, files to store implementation of customized subclasses. Databases/data structures include alarm queue DB, which provides asynchronous, first-in first-out, and persistent storage of alarms. Alarm queue database is a relational database to store alarms with meta data information about queue. Also, rule DB stores rules and implementations of customized predicates and actions. Rule DB stores instances of rules in XML files and class files for implementations of predicates and actions. Further, alarm definition DB maintains a list of alarm definitions, including instances of alarm definitions in XML files and class files for implementations of alarm definitions. Yet further, condition DB stores customized filtering conditions, including class files of customized alarms. Even further, alarm log DB saves all terminated alarms, including instances of alarms. Further still, in-memory active alarms DB is a data structure in memory that stores active alarms.

Figure 4:
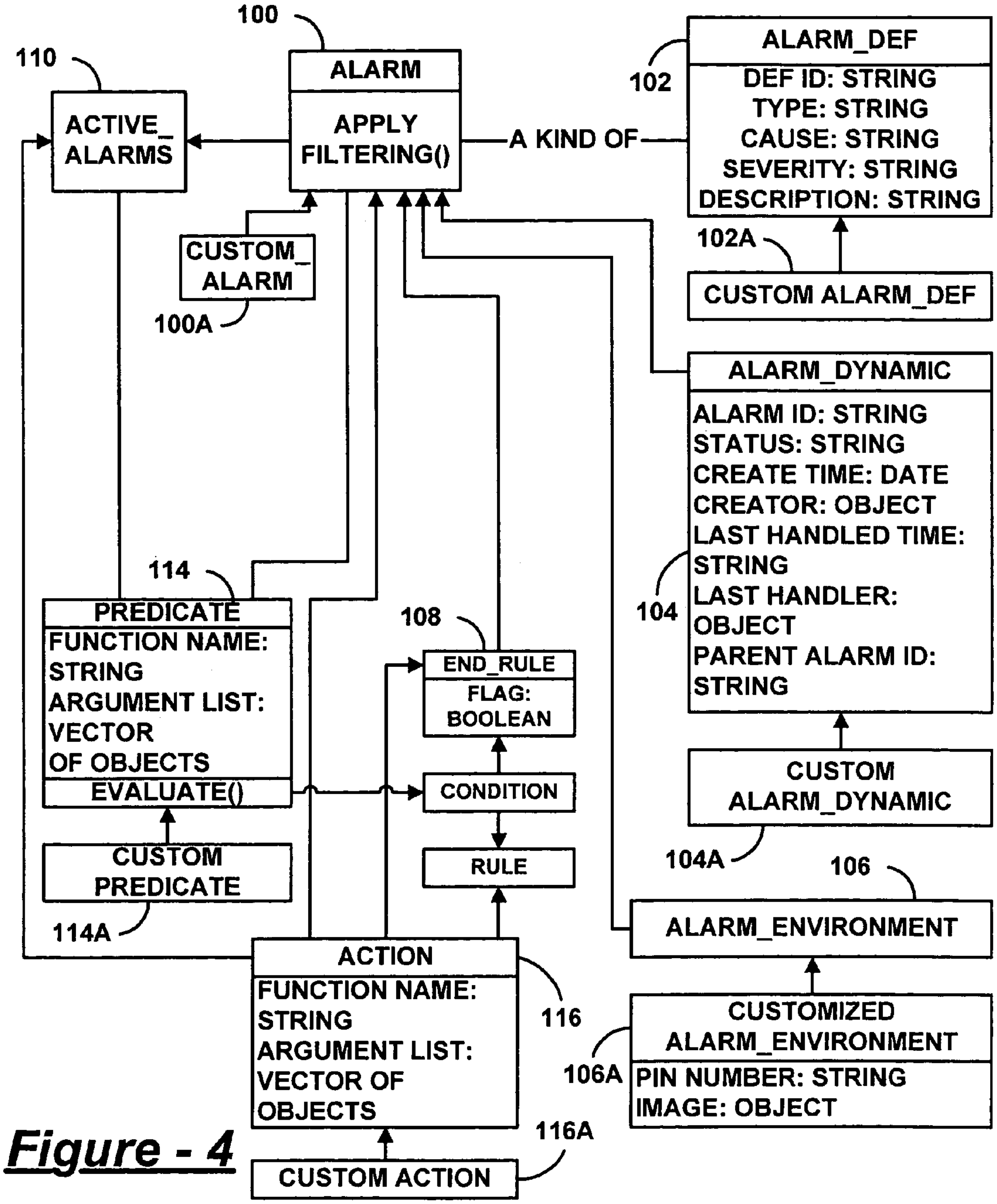
FIG. 4 is a block diagram illustrating an object-oriented class structure for software objects employed by an alarm management system in accordance with the present invention.

Turning now to FIG. 4, the alarm class 100 includes an alarm_definition class 102, an alarm_dynamic class 104, and an alarm_environment class 106. The alarm_definition class 102 contains the list of static alarm definitions that are usually created during configuration of the system by administrators. Typically, they are not changed often. The alarm_dynamic class 104 is defined to capture information of an alarm when it is generated by devices or servers. It manages the lifecycle of the alarm. The alarm_environment class 106 contains information of the environment when it is generated. Customers can customize a class 100A, 102A, 104A, 106A, 114A, and 116A by defining a customized class as a subclass of the class. An end_rule class 108 contains a rule that governs a life span of an alarm and actions to be taken when the alarm terminates. An active_alarms class 110 is a set of alarms that are actively used by the alarm server to evaluate the current alarm and support the alarm correlation feature.

A rule class includes a condition class 114 and an action class 116. The condition class is a set of predicates. A predicate can be a function that returns true or false. A predicate can have the active_alarms class 110 and/or the alarm class 100 as parameters of the function. The action class 116 is a function with the active_alarms class 110 and/or the alarm class 100 as parameters. Examples of functions performed by the action class 116 are sending email, notification, and so on. In order to support extension of the system, the predicate class 114 and action class 116 can be customized via a subclass. A customized predicate class 114A can implement the evaluate( ) member function, and a customized action class 116A can implement the execute( ) member function.

Figure 5:
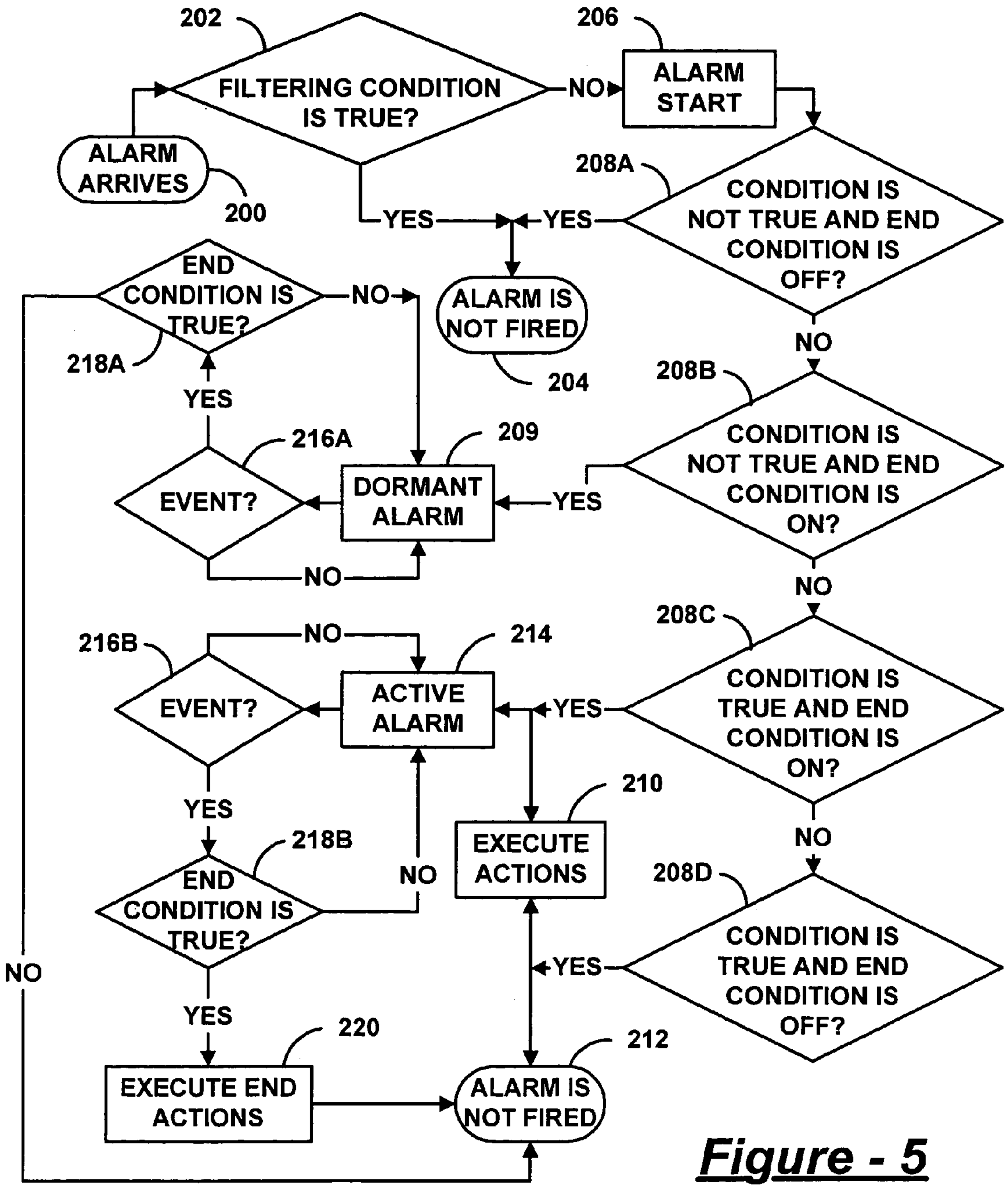
FIG. 5 is a flow diagram that illustrates an alarm management method in accordance with the present invention.

Turning now to FIG. 5 when an alarm arrives to the alarm management system at 200, the system executes a filtering condition 202 associated with the alarm to filter out unqualified alarms. If the filtering condition is true, it means the alarm is ignored and the state becomes "Alarm not fired" at 204. Otherwise, the alarm moves to the next processing stage and the state becomes "Alarm Start" at 206. In the "alarm start" state, the alarm is compared with rules at 208A-208D. If there is no condition met, the alarm is not fired at 204. Depending on an end condition, there are two cases. If the end condition is off but no condition is met as at 208A, the alarm is not stored in the active alarm list, but immediately goes to the end state ("Alarm not fired" state) at 204. Otherwise as at 208B, the alarm is stored in the dormant alarm list at 209 and considered for correlation with incoming alarms.

If at least one condition is true, there are two cases. The first case is when there is no end condition for the alarm 208D. Lack of an end condition means that the alarm is transient and will not be in the active list. In this case, the actions associated with the condition are executed at 210 and the alarm immediately becomes completed at 212. The other case is when there is an end condition associated with the alarm as at 208C. In this case, the associated actions are executed at 210 and the alarm becomes active at 214. The status of an active or dormant alarm will eventually become completed at 212 upon an event as at 216A and 216B, but only if the end condition is true as at 218A and 218B. When an active alarm is terminated, any end actions associated therewith can be executed at 220.

Various events can terminate an active alarm. For example an alarm event occurs when a new alarm arrives and the end condition of the new alarm is met. Also, a timer event occurs when the end condition is specified as duration of time and the timer expires. Further, a counter event occurs when the end condition is specified as a limitation on a number of total active alarms and the number goes beyond the limitation. These types of events can similarly terminate a dormant alarm.

A specification of rules for the present invention is explored immediately below. A rule can be written as follows:

$$F1(P11, P12, \ldots, P1n_1)\hat{}F2(P21, P22, \ldots, P2n_2)\hat{}\ldots Fm(Pm1, Pm2, \ldots, Pmn_m) \to Action_1, Action_2, \ldots, Action_k$$

where: (a) Fi is a predefined or customized boolean function that returns true or false; (b) Pij is either: (i) a constant, usually from the alarm_definition class; (ii) an attribute of the current alarm or the current alarm itself, instantiated by a customized subclass of the alarm class (it could be an attribute, a group of attributes, or the class itself; however, since it is not easy to represent a group of attributes, it is preferably restricted to either an attribute or the class); or (iii) an iterator of alarms that is a reference to the list of either active alarms or previously qualified alarms from a previous predicate (it is assumed that this iterator is input and output; in other words predicate Fi takes the iterator, processes it, and returns a modified iterator that satisfies Fi, thus implementing binding); and (c) $action_i$ is a predefined or customized function.

A few notes are worthwhile to mention: (a) the semantic is that if F1, F2, and Fm are true, then execute $action_1$, $action_2$, . . . , and $action_k$ in order; (b) the order of predicates of a condition and actions is important; and (c) the number of arguments of a function is unlimited; three arguments, however, may be sufficient to define meaningful conditions, such as a constant, the current alarm, and an iterator.

A specification of conditions and actions for the present invention is explored immediately below. Conditions and actions are where an administrator or developer can define customized predicates and actions. The following key words and conventions are provided to help them to define conditions: (a) a constant is represented by double quote, such as "Door is Open", or "1234"; ALARM is a key word to denote the current alarm, such that an attribute of the alarm can be by addition of a dot and the name of the attribute following the key word (e.g., ALARM.alarm_id); (b) FULL_ITERATOR is a key word to denote a reference to the list of the active alarms; (c) CURRENT_ITERATOR is a key word to denote a reference to the list of qualified alarms by the previous predicate; (d) CURRENT_ITERATOR is introduced to support of the concept of binding. For example, the semantic of the condition, A(FULL_ITERATOR) and B(FULL_ITERATOR) where A( ) and B( ) are Boolean functions, is to evaluate A( ) with the active alarms and returns true if there exists at least one qualified alarm. The same logic is applied to B( ). However, there are some cases where B( ) needs to be evaluated with the qualified alarms from A( ), instead of the active alarms. The condition, A(FULL_ITERATOR) and B(CURRENT_ITERATOR) can be used for this purpose.

An implementation of Boolean functions for the present invention is explored immediately below. The alarm management system can provide a set of predefined Boolean functions, such as equal( ), lessthan( ), greaterthan( ), and so on. Implementing a customized Boolean function requires the following steps: (a) define a Boolean function matching the name and arguments with the XML file in a .java file; note that the keyword, such as ALARM and FULL_ITERATOR, should not be used here because the customized alarm class replaces ALARM and the alarm_iterator class replaces FULL_ITERATOR and CURRENT_ITERATOR; (b) compile the .java to create a .class file; and (c) place the class file into the designated place.

An implementation of a rule engine for the present invention is explored immediately below. Given an alarm, the engine reads rules written in XML, applies the rules, and executes actions if conditions are met. Note that the engine does not know details of customized alarms and rules since the engine is implemented before the alarms and rules are defined.

Here is an algorithm for evaluating rules: (A) receive an alarm; (B) read all rules in XML from the system; (C) for each rule, get the condition and the predicates: (1) for each predicate, get a function name and description of arguments: (a) build the arguments in Java: (i) if it is a constant, assign it to the argument; (ii) if it is ALARM, assign the reference of the customized alarm to the argument; (iii) if it is FULL_ITERATOR, assign the reference of the iterator of the active alarms to the argument; (iv) If it is CURRENT_ITERATOR, assign the reference of the iterator of the argument of the latest Boolean function to the argument; (b) load the function dynamically; (c) execute the function with the arguments; (d) if the return value is false, stop and go to (C) for the next rule; if the return value is true and the predicate is the last one, build a list of actions; (e) if it is not the last condition, update the iterator argument from this function and go to (1) for the next predicate; (D) after the rules are evaluated, the engine sends a list of actions to the action handler.

Procedures for customization according to the present invention are explored immediately below. The following is the procedure to customize the system: (a) customize the alarm_definition class: (i) extend the alarm_definition class; (ii) compile the .java class and place it into a depository; (iii) create instances of the extended class; and (iv) store the instances; (b) customize the alarm_dynamic class: (i) extend the alarm_dynamic class; and (ii) compile the java class and place it into a depository; (c) customize the alarm_environment class: (i) extend the alarm_environment class; and (ii) compile the .java class and place it into a depository; (d) customize the alarm class: (i) extend the alarm class by including the customized alarm_definition, customized alarm_dynamic, and/or customized alarm_environment class; (ii) compile the java class and place it into a depository; (e) customize the action class: (i) extend the action class; (ii) implement the member function, execute( ); and (iii) compile the .java class and place it into a depository; (f) customize the predicate class: (i) extend the predicate class; (ii) implement the member function, evaluate( ); (iii) compile the .java class and place it into a depository; (g) store rules: (i) store rules in XML; and (h) alarm generator: (i) instantiate the customized alarm class; and (ii) send the instance of the customized alarm class to the alarm server.

As can be appreciated from the foregoing description, the alarm server according to the present invention provides several advantageous features. For example, it efficiently manages multiple surveillance systems. Also, it supports many formats of alarms. Further, it supports flexible conditions and actions. Yet further, it supports a flexible rule evaluation engine. Further still, it supports customization without reprogramming. Even further, it reduces the cost of development and customization. Even further still, it supports interoperability via web services. Finally, it easily integrates with external systems.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An alarm management system, comprising:

an alarm receiver module adapted to receive alarms from one or more of sensor devices and surveillance systems and generate definitions based on the alarms in accordance with an alarm class that contains a list of static alarm definitions, alarm information, and environment information;

a condition evaluation module adapted to receive the definitions from the alarm receiver module and evaluates the definitions in accordance with an condition class that contains a set of alarm predicates;

an action handling module adapted to receive the evaluations from the condition evaluation module and executes actions based on the evaluations in accordance with an action class that contains a list of alarm actions; and a customization interface adapted to communicate with the alarm receiver module, the condition evaluation module, and the action handling module, wherein the customization interface enables a user to define customized alarms as subclasses of the alarm class, customized conditions as subclasses of the condition class, and customized actions as subclasses of the action class.

2. The system of claim 1, further comprising a user interface providing user capabilities to search, add, delete, and update instances of alarm definitions, conditions, and actions which are dynamically loaded into the system.

3. The system of claim 1, wherein said condition evaluation module includes a rule engine for processing alarms by evaluating customized rules to determine if one or more customized actions should be executed based on customized conditions associated with a customized rule.

4. The system of claim 3, wherein said condition evaluation module includes a filtering condition handler evaluating a filtering condition to determine whether an alarm should be ignored or else processed by said rule engine.

5. The system of claim 3, wherein said rule engine requests external systems to evaluate conditions specified by a rule.

6. The system of claim 2, further comprising a development interface allowing developers to extend said alarm management system by providing SDK and APIs to customize alarms, predicates, and actions and to save implementation files so that they can be dynamically loaded into the system.

7. The system of claim 1, further comprising an alarm state management module managing lifecycles of alarms and keeping track of active alarms.

8. The system of claim 1, further comprising a system to read dynamic configuration information of a device from an external database.

9. The system of claim 1, further comprising a user interface providing user capabilities to search, add, delete, and update instances of alarm definitions and conditions, thereby generating customized alarms, rules for conditionally initiating a customized sequence of actions based on an evaluation of a customized alarm, and customized filtering conditions for conditionally preventing a customized alarm from being evaluated by the customized rules.

10. An alarm management method, comprising:

receiving alarms from one or more of sensor devices and surveillance systems;

generating definitions based on the alarms in accordance with an alarm class that contains a list of static alarm definitions, alarm information, and environment information;

generating evaluations based on the definitions in accordance with a condition class that contains a set of alarm predicates;

executing actions based on the evaluations in accordance with an action class that contains a set of alarm actions; and enabling a user to define customized alarms as subclasses of the alarm class, customized conditions as subclasses of the condition class, and customized actions as subclasses of the action class.

11. The method of claim 10, further comprising providing a user interface capable of being used to search, add, delete, and update instances of alarm definitions and conditions.

12. The method of claim 10, wherein performing the evaluation includes performing an evaluation of rules to determine if one or more customized actions associated with a customized rule should be executed based on customized conditions associated with a customized rule.

13. The method of claim 10, wherein performing the evaluation includes evaluating a customized filtering condition to determine whether an alarm should be ignored or else processed by performing the evaluation of the customized rules.

14. The method of claim 10, wherein performing the evaluation includes communicating a request to an external system to evaluate one or more conditions specified by a rule.

15. The method of claim 10, wherein performing the evaluation includes getting a condition and one or more predicates for each rule.

16. The method of claim 15, wherein performing the evaluation includes getting a function name and description of arguments for each predicate.

17. The method of claim 16, wherein performing the evaluation includes:

(a) building the arguments;

(b) loading the function; and (c) executing the function with the arguments, thereby performing the evaluation.

18. The method of claim 17, wherein building the arguments includes one or more of:

(i) assigning a value in the description to an argument;

(ii) assigning a reference of a customized alarm to an argument;

(iii) assigning a reference to a data structure of a set of all active alarms to the argument; and (iv) assigning a reference to a data structure of a set of active alarms to the argument, said reference selected because of its assignment to another identifiable argument.

19. The method of claim 10, wherein executing the customized actions includes:

(a) building a collection of actions based on results of the evaluation; and (b) sending the collection of actions to an action handling module adapted to execute the actions.

20. The method of claim 10, further comprising providing a development interface allowing developers to extend an alarm management system by providing SDK and APIs to customize alarms, predicates, and actions and to save implementation files so that they can be dynamically loaded into the system.

21. The method of claim 10, further comprising managing lifecycles of alarms and keeping track of active alarms.

22. The method of claim 10, wherein performing the evaluation includes communicating a request to active alarms for correlation of event.

23. An alarm management system, comprising:

an alarm receiver module adapted to receive alarms from one or more of sensor devices and surveillance systems and generate definitions based on the alarms in accordance with an alarm class that contains a list of static alarm definitions, alarm information, and environment information;

a filtering condition handler adapted to receive the definitions from the alarm receiver module and generate evaluations based on the definitions in accordance with a filtering condition class that contains a set of filtering condition predicates;

a rule engine adapted to receive the evaluations from the filtering condition handler and generate an evaluation based on conditions associated with a rule in accordance with a rule class that contains a set of rules, including: (a) getting a condition and one or more predicates for each rule; (b) getting a function name and description of arguments for each predicate; and (c) executing a function with described arguments, thereby evaluating the rule;

an action handling module adapted to receive the evaluation from the rule engine and execute actions based on the evaluation by said rule engine and in accordance with an action class that contains a list of alarm actions.

* * * * *